United States Patent
Chakrapani et al.

(10) Patent No.: US 9,390,183 B1
(45) Date of Patent: Jul. 12, 2016

(54) IDENTIFYING NAVIGATIONAL RESOURCES FOR INFORMATIONAL QUERIES

(71) Applicant: Google Inc., Mountain View, CA (US)

(72) Inventors: Lakshmi N. Chakrapani, Mountain View, CA (US); April R. Lehman, Mountain View, CA (US); Neil C. Fernandes, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/630,721

(22) Filed: Feb. 25, 2015

Related U.S. Application Data

(62) Division of application No. 13/731,857, filed on Dec. 31, 2012, now Pat. No. 9,244,972.

(60) Provisional application No. 61/636,479, filed on Apr. 20, 2012.

(51) Int. Cl.
*G06F 17/30* (2006.01)

(52) U.S. Cl.
CPC ............................... *G06F 17/30867* (2013.01)

(58) Field of Classification Search
None
See application file for complete search history.

(56) References Cited

U.S. PATENT DOCUMENTS

| | | | |
|---|---|---|---|
| 7,945,668 B1 | 5/2011 | Nucci et al. | |
| 8,386,495 B1 | 2/2013 | Sandler et al. | |
| 8,458,196 B1 * | 6/2013 | Procopio | G06F 17/30705 707/749 |
| 8,504,583 B1 * | 8/2013 | Ke | G06F 17/30867 707/706 |
| 8,600,984 B2 * | 12/2013 | Fleischman | G06Q 50/01 707/705 |
| 8,615,514 B1 | 12/2013 | Fernandes et al. | |
| 8,620,929 B2 | 12/2013 | Shon et al. | |
| 8,620,951 B1 | 12/2013 | He et al. | |
| 8,645,298 B2 * | 2/2014 | Hennig | G06N 7/005 706/12 |
| 8,694,511 B1 | 4/2014 | Corduneanu et al. | |
| 2005/0060290 A1 | 3/2005 | Herscovici et al. | |
| 2005/0222987 A1 * | 10/2005 | Vadon | G06F 17/30997 |
| 2006/0064411 A1 | 3/2006 | Gross et al. | |
| 2013/0346386 A1 | 12/2013 | Zandona et al. | |

OTHER PUBLICATIONS

Autocomplete [date unknown], Google, https://supportgoogle.com/websearch/answer/106230Thl=en, 3 pages.
Gibbs, I've got a suggestion Dec. 10, 2004, blogspot.com, http://googleblog.blogspot.com/2004/12/ive-got-suggestion.html, 2 pages.
Brin et al., The Anatomy of a Large-Scale Hypertextual Web Search Engine, Dec. 29, 1998, http://infolab.stanford.edu/pub/papers/google.pdf, 20 pages.
Dell Latitude D600, http://www.dell.com/downloads/global/products/latit/en/speclatit_d600_en.pdf, dell.com, 2003, 2 pages.
Upstill, Trystan G. et al., "Navigational Resources for Queries", U.S. Appl. No. 12/354,426, filed Jan. 15, 2009, 43 pages.

\* cited by examiner

*Primary Examiner* — Jason Liao
(74) *Attorney, Agent, or Firm* — Fish & Richardson P.C.

(57) ABSTRACT

Methods, systems, and apparatus, including computer program products, for creating a mapping between topics and navigational resources are disclosed. The mapping is created based on hybrid queries having both characteristics of informational queries and navigational queries. The mapping between topics and resources can be used in scoring search results for ranking, for example. Other mappings created based on other types of hybrid queries and their applications are also disclosed.

18 Claims, 6 Drawing Sheets

IDENTIFYING NAVIGATIONAL RESOURCES FOR INFORMATIONAL QUERIES

CROSS REFERENCE TO RELATED APPLICATIONS

This application is a divisional of U.S. patent application Ser. No. 13/731,857, filed Dec. 31, 2012, which claims the benefit of U.S. Provisional Patent Application No. 61/636,479, filed on Apr. 20, 2012, the entire contents of each are hereby incorporated by reference.

BACKGROUND

This specification relates to digital information retrieval, and particularly to processing search results for search queries.

The Internet enables access to a wide variety of resources, for example, video or audio files, webpages for particular topics or subjects, articles, blog postings, and news articles. A search engine can identify resources in response to a user query that includes one or more search terms or phrases. The search engine ranks the resources based on their relevance to the query and optionally other factors and provides search results that link to the identified resources in an order according to the ranking.

SUMMARY

This specification describes technologies related to identifying navigational resources for informational queries. In particular, navigational resources are identified for particular topics based on a collection of recorded past user queries, so-called "hybrid queries," that include both characteristics of informational queries and navigational queries.

In general, one aspect of the subject matter described in this specification can be embodied in methods that include the actions of processing a query log to identify a plurality of hybrid queries, each hybrid query including a respective topic keyword that identifies a respective topic and a respective navigation keyword that identifies a respective navigational resource; creating a first mapping, the first mapping including a plurality of first associations each associating one of a plurality of unique navigational resources among the respective navigational resources identified in the plurality of hybrid queries with a respective group of one or more topics that are each identified in at least one of the hybrid queries that also identify the unique navigational resource; for each of one or more of the first associations in the first mapping: generalizing the respective group of one or more topics in the first association to identify one or more additional topics not present in the respective group; and augmenting the first association to associate the one or more additional topics with the unique navigational resource in the first association; inverting the first mapping to obtain a second mapping, the second mapping including a plurality of second associations each associating one of a plurality of unique topics among the topics present in the first mapping with a respective group of one or more navigational resources, where each of the one or more navigational resources of the respective group is associated with the unique topic in the first mapping; and using the second mapping in scoring candidate search results for search queries.

Other embodiments of this aspect include corresponding systems, apparatus, and computer program products.

These and other embodiments can optionally include one or more of the following features. Creating the first mapping comprises: filtering a plurality of initial associations based on one or more association precision criteria, each initial association associating a unique navigational resource among the respective navigational resources identified in the plurality of hybrid queries and a unique topic among the respective topics identified in one or more of the plurality of hybrid queries that identify the unique navigational resource; based on the filtered initial associations, generating an initial topic-to-resource mapping, the initial topic-to-resource mapping including a plurality of third associations each associating one of a plurality of unique topics among the topics present in the filtered initial associations with a respective group of one or more navigational resources, where each navigational resource of the respective group is associated with the unique topic in a respective one of the filtered initial associations; and inverting the initial topic-to-resource mapping to generate the first mapping. The one or more association precision criteria include a minimum fraction that a click count for the unique navigational resource identified in each filtered initial association accounts for in a total click count for the hybrid queries that identify both the unique navigational resource and the unique topic of the filtered initial association. The one or more association precision criteria include a minimum number of recorded search sessions in which query revisions from an informational query for the unique topic of each filtered initial association to a navigational query for the unique navigational resource of the filtered initial association have occurred. The one or more association precision criteria include a requirement that the unique navigational resource of each filtered initial association receives at least a threshold number of recorded clicks for informational queries containing the respective topic keyword of the unique topic identified in the filtered initial association. For each of one or more of the second associations in the second mapping, calculating a respective association score for at least one navigational resource identified in the second association, where using the second mapping in scoring the candidate search results for the search queries comprises using the respective association scores of the navigational resources in the one or more of the second associations in scoring the candidate search results for the search queries. Calculating the respective association score for the at least one navigational resource identified in the second association further comprises: for a first navigational resource identified in the second association: identifying, from the query log, a plurality of informational queries consisting of the topic keyword of the unique topic in the second association; identifying one or more of the informational queries for which the first navigational resource identified in the second association has received one or more clicks as a search result; and calculating the respective association score for the first navigational resource based at least on a total number of clicks that the first navigational resource identified in the second association has received as the search result for the one or more of the informational queries. Calculating the association score for the at least one navigational resource identified in the second association further comprises: for a first navigational resource identified in the second association: determining a count of recorded search sessions in which query revisions from an informational query for the unique topic identified in the second association to a navigational query for the first navigational resource identified in the second association have occurred; and calculating the association score for the first navigational resource based at least on the count of the recorded search sessions that has been determined. Calculating the association score for the at least one navigational resource identified in the second association further comprises: for a first navigational resource identified in the second association: determining, among the second associations in the second mapping, a total count of the unique topics associated with the first navigational resource; and calculating the association score for the first navigational resource based at least on the total count of the unique topics. Calculating the association score for the at least one navigational resource identified in the second association further comprises: for a first navigational resource identified in the second association: identifying, from a document corpus, respective anchor text of a plurality of hyperlinks pointing to the first navigational resource identified in the second association; determining a count of appearances that the topic keyword of the unique topic in the second association makes in the respective anchor text of the plurality of hyperlinks; and calculating the association score for the first navigational resource based at least on the count of appearances. Categorizing each unique topic in the second mapping into respective one or more of a plurality of unique verticals; creating a vertical-to-resource mapping comprising a plurality of vertical-to-resource associations, each vertical-to-resource association associating a respective one of the unique verticals with a respective group of navigational resources, where each of the navigational resources of the respective group is associated with at least one of the unique topics in the second mapping that has been categorized into the respective unique vertical; and using the vertical-to-resource mapping in scoring candidate search results for search queries that are categorized into one or more of the plurality of unique verticals. The navigational resources in the second mapping are websites or webpages having respective associated web addresses. Determining a first topic related to a user-submitted search query; identifying one or more navigational resources associated with the first topic according to the second mapping; and providing a user interface element on a search result webpage for the user-submitted search query, the user interface element configured to identify the one or more navigational resources associated with the first topic. Detecting that terms of a partially-completed search query received from a search input interface match a first unique topic present in the second mapping; identifying one or more navigational resources associated with the first unique topic; and scoring candidate auto-completions for the partially-completed search query based at least on whether the candidate auto-completions have search results leading to the one or more navigational resources that have been identified.

In general, one aspect of the subject matter described in this specification can be embodied in methods that include the actions of processing a query log to identify a plurality of queries that each include terms identifying a first topic of a plurality of topic and terms identifying a first author of a plurality of authors; for the first author, identifying a respective plurality of resources for which the first author has claimed authorship on the Internet; determining that a threshold amount of clicks have been received by search results of the plurality of queries that point to the resources to which the first author has claimed authorship; and upon the determining, creating a respective topic-to-author association from the first topic to the first author.

These and other embodiments can optionally include one or more of the following features. Creating a topic-to-author mapping by repeating the steps in the previous paragraph for at least one additional topic in the plurality of topics and at least one additional author in the plurality of authors, where the topic-to-author mapping includes the respective topic-to-author association from the first topic to the first author and the respective topic-to-author association from the at least one additional topic to the at least one additional author; and using the topic-to-author mapping in scoring candidate search results for queries.

Other embodiments of this aspect include corresponding systems, apparatus, and computer program products.

In general, one aspect of the subject matter described in this specification can be embodied in methods that include the actions of processing a query log to identify a plurality of hybrid queries, each hybrid query including a respective topic keyword that identifies a respective topic and a respective navigation keyword that identifies a respective navigational resource;

processing plurality of hybrid queries to obtain a topic-to-resource mapping, the topic-to-resource mapping including a plurality of associations each associating one of a plurality of unique topics with a respective group of one or more navigational resources, the unique topic is either (A) present in a same hybrid query as at least one of the one or more navigational resources of the respective group, or (B) a generalized topic of two or more topics each present in a respective same hybrid query as one of the one or more navigational resources of the respective group; and using the second mapping in scoring candidate search results for search queries.

Other embodiments of this aspect include corresponding systems, apparatus, and computer program products.

Particular embodiments of the subject matter described in this specification can be implemented to realize one or more of the following advantages. The relevance score of a navigational resource as a candidate result for an informational query can be increased based on an association between the navigational resource and the topic of the informational query. When a user enters the informational query in a search session, the increased relevance score for the navigational resource may boost the ranking of the search result leading to the presentation of the navigational resource in a search result page. This helps the user to quickly find the high quality navigational sources for a topic without going through a lengthy learning and query revision process.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
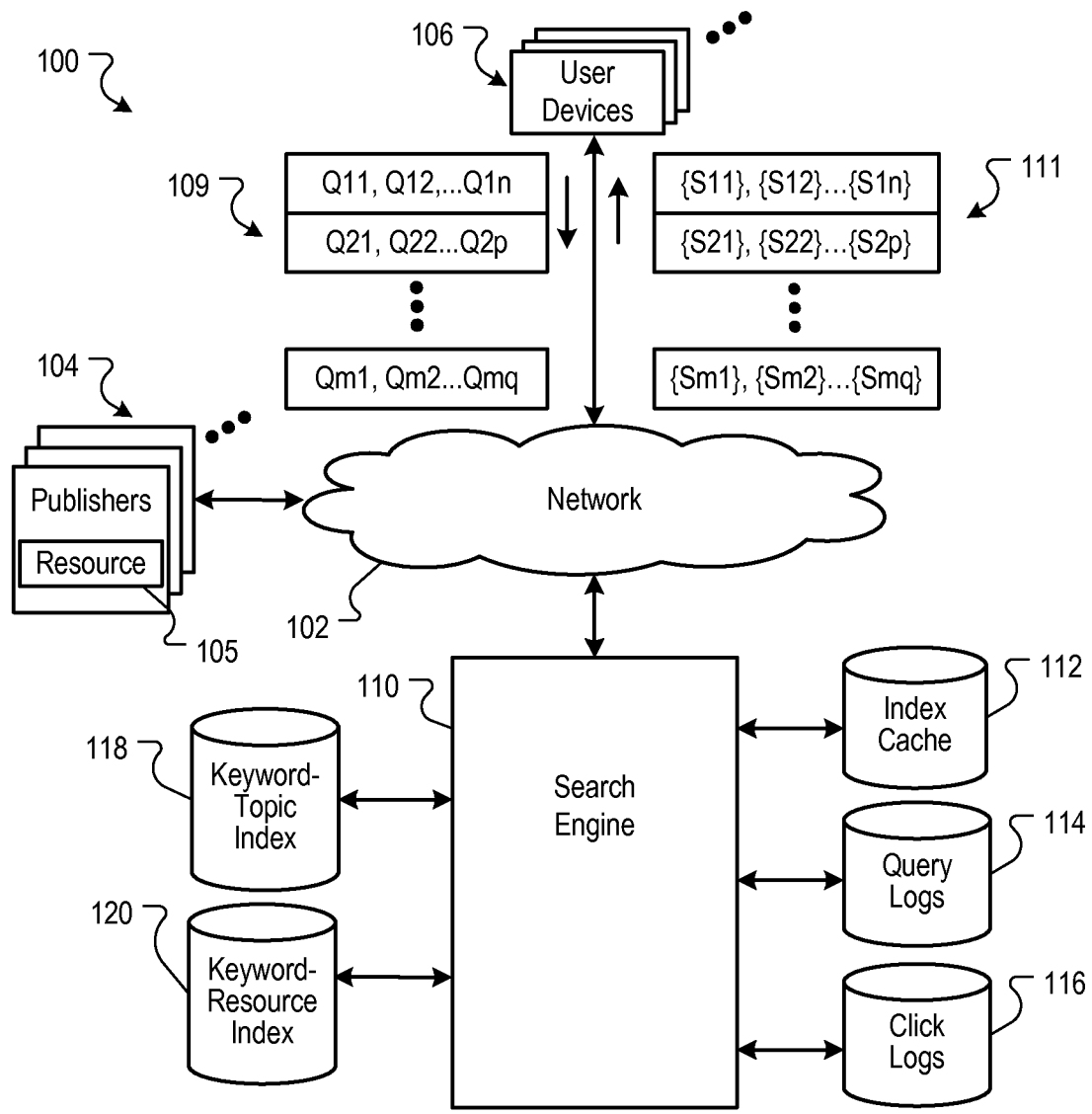
FIG. 1 is a block diagram of an example environment in which a search engine provides search services.

FIG. 1 is a block diagram of an example environment 100 in which a search engine 110 provides search services to users. The search engine 110 can be implemented in software running on one or more computers in one or more locations. A computer network 102, e.g., a local area network (LAN), wide area network (WAN), the Internet, or a combination of them, connects publishers 104, user devices 106, and the search engine 110. The online environment 100 may include many thousands of publishers 104 and user devices 106.

A publisher 104 is any website that hosts and provides electronic access to a resource through the network 102. A website is one or more resources 105 associated with a domain name. An example website is a collection of webpages formatted in hypertext markup language (HTML) that can contain text, graphic images, multimedia content, and programming elements, e.g., scripts.

A resource is any data that can be provided by the publisher 104 over the network 102 and that is associated with a resource address. Resources include HTML pages, word processing documents, portable document format (PDF) documents, images, video, and feed sources, to name just a few. The resources include content, e.g., words, phrases, pictures, and so on, and may include embedded information, e.g., meta information and hyperlinks, and/or embedded instructions, e.g., JavaScript scripts.

Each resource has an addressable network location that can be uniquely identified by a resource locator, e.g., a universal resource locator (URL). The resources that belong to the same website generally have universal resource locators that refer to the same web host.

A user device 106 is an electronic device that is under the control of a user and is capable of requesting and receiving resources over the network 102. Example user devices 106 include personal computers, mobile communication devices, e.g., smart phones, and other devices that are capable of sending and receiving data over the network 102. A user device 106 typically includes a user application, e.g., a web browser, to facilitate the sending and receiving of data over the network 102.

As there are many thousands of publishers, there are millions of resources 105 available for access over the network 102. To facilitate searching of these resources, the search engine 110 identifies the resources by crawling the publishers 104 and indexing the resources provided by the publishers 104. The index and, optionally, cached copies of the resources, are stored in an index cache 112 of the search engine 110.

The user devices 106 submit search queries 109 to the search engine 110. In response, the search engine 110 uses the index cache 112 to identify resources that are relevant to the queries. The search engine 110 identifies the resources in the form of search results 111 and returns the search results 111 to the user devices 106, generally in search results webpages. A search result 111 is data generated by the search engine 110 that identifies a resource that satisfies a particular search query according to various relevance and/or other quality measures, and includes a resource locator for the resource. An example search result 111 can include a title of a relevant resource, e.g., a title of a webpage, a snippet of text extracted from the resource, and the URL of the resource.

In some implementations, the search results are ranked based on scores of the resources identified by the search results, e.g., information retrieval (IR) scores. The IR scores can be based on relevance and quality information used by the search engine 110, for example, from the content of the webpages and/or the user interaction logs, e.g., query log 114 and click log 116. In some implementations, the search engine 110 anonymizes data in the query log 114 and click log 116. The search results 111 are provided to the user device 106 on a search result webpage in an order according to their scores. Candidate search results whose scores do not meet one or more predetermined thresholds may be omitted from the search result webpage.

The user devices 106 receive the search result webpages and render the webpages for presentation to users. In response to a user selecting a search result at a user device 106, software running on the user device 106, e.g., a web browser, requests the resource identified by the resource locator included in the selected search result. The publisher 104 hosting the resource receives the request for the resource from the user device 106 and provides the resource to the requesting user device 106.

A user often submits multiple queries during a search session. Sometimes, a user will refine and focus a search on a particular topic by incorporating new information learned through the search results of earlier queries into a subsequent search query. As the user continues to refine his or her search in a search session, a query sequence or query revision path is generated. In some implementations, the search engine 110 anonymizes search session data for users.

The queries submitted during various search sessions are stored in a query log 114. In particular, the query log 114 stores both individual queries submitted over time and query sequences submitted during individual search sessions. Additional information related to each query, e.g., the search results presented in response to the query, the terms of the query, a topic associated with the query, a vertical associated with the query, a language of the query, and so on, can be stored in association with the query in the query logs 114 or in other data stores or logs, e.g., in an augmented query log. A term of a search query is a word or phrase that is present in the search query. Optionally, terms of a search query do not include any stop words that may be present in the search query. A vertical is a topical category that includes a group of related topics. Examples of verticals include shopping, automotive, legal, medical information, travel, government, entertainment, and so on.

User interaction data, e.g., selection data, defining actions taken with respect to search results provided during various search sessions are stored in a click log 116. The data in the click log 116 indicates whether a search result was selected so as to be viewed, which will be referred to as being "clicked."

The search engine 110 receives many repeated queries, e.g., queries with identical search terms, submitted by different users. Some of these repeated search queries are informational queries each aimed at searching for information related to a particular topic described by the search terms of the query. These informational queries each include one or more terms that form keyword or keywords identifying the topic of the search. Sometimes, the search engine 110 can store one or more of the most common keywords used to identify a topic as the naming keyword or keywords for the topic. The naming keyword of a topic is also referred to as a "topic keyword" of the topic. When a user submits an informational query to the search engine 110, search results covering various aspects of the topic can be retrieved. In some implementations, the association between a topic and the naming keyword or keywords of the topic can be stored in a keyword-topic index 118.

For example, a student interested in learning about the history and culture of Native Americans may enter a query containing the search terms "Native Americans." The search terms "Native Americans" constitute a keyword that may be the naming keyword of a corresponding topic in the keyword-topic index 118. Based on this search query, the search engine 110 can return search results that point to websites or webpages having content related to various aspects of the topic "Native Americans." Example search results can include an online encyclopedia page dedicated to information on Native Americans, a website selling Native American art works, a website providing information on Native American culture to kids, a webpage on the history of Indian tribes in California, a webpage introducing books on Native American history and culture, and so on.

In another example, a user seeking to figure out why her apple tree never fruits can enter a query containing the search terms "growing apples." Based on this search query, the search engine 110 can return search results that point to websites or webpages having content on various aspects of growing apple trees. Example search results can include a webpage on a nursery with tips for growing apple trees in a home garden, a webpage on apple farming, an online video posted by a farmer on how he grows apple trees on his farm, a webpage on an official government website of a farming state, and so on.

Based on information learned from the search results of an informational query, a user can revise his or her original query, and submit a new query that better focuses the search on a subtopic of his or her interest. For example, after finding out that apples grow differently in different climates. The user can revise her query to "growing apples in California." After finding out that different types of apples have different growing habits, the user may further revise her query to "growing Fuji apples in California." Eventually, the search is focused enough such that the search results can satisfy the user's information need, i.e., help her find out why her Fuji apple tree never fruited. The sequence of queries that the user entered in search of the information he or she needed forms a query revision path.

Sometimes, a user wishes to access a well-known website, or the authoritative or official website of a well-known entity, and to do so, the user simply submits a query containing the known name of the website or entity. Even though there are other websites or webpages that may contain information related to the terms of the search query, the search engine will provide the homepage of the well-known website or the homepage of the entity's official website as a top search result, so that the user can easily navigate to the website through the link in the search result provided by the search engine. Such queries can be referred to as "navigational queries," and the website that is indicated by a navigational query can be called the "navigational resource" associated with the navigational query.

For example, a user looking to visit the official website of the news network CNN can enter a query containing the term "CNN." As a result, the search engine can provide the homepage of the CNN official website as the top search result. For another example, a user looking to visit the website "http:www.webMD.com" can enter a query containing the term "WebMD," and the search engine will provide the homepage of the WebMD website as the top search result. In these examples, the term "CNN" constitutes a keyword that is the naming keyword of the navigational resource identified by the web address "http://www.cnn.com," and the term "WebMD" constitutes a keyword that is the naming keyword of the navigational resource identified by the web address http://www.webMD.com.

In some implementations, the search engine stores the naming keyword or keywords for each navigational resource that users frequently access through searching using queries containing the naming keyword or keywords. The search engine can present the navigational resource identified by a naming keyword as a top search result when a query containing the naming keyword of the navigational resource is received from a user. The search engine can revise the records of naming keywords and their associated navigational resources and store addition navigational resources and their respective naming keywords based on new entries collected from the query log 114 and the click log 116. The associations between navigational resources and their respective naming keywords can be stored in a keyword-resource index 120. The naming keyword of a navigational resource can also be referred to as a "navigation keyword" of the navigational resource.

Sometimes, a user who is aware of a good source on information related to a topic can focus his or her search within that information source by submitting search terms identifying the information source along with search terms identifying the topic in a single search query. For example, if a user thinks that the website "WebMD" at "http://www.WebMD.com" is a good place to look for information on various diseases and treatment options, the user may enter a search query "back pain WebMD" when he or she wishes to find information on back pain. The search query "back pain WebMD" includes both terms that identify a topic, e.g., "back pain," and terms that identify a particular navigational resource, e.g., the website located at "http://www.WebMD.com". If many users have submitted the query that includes both the terms "back pain" and the term "WebMD" in the same query, it is likely that the navigational resource identified by the term "WebMD," i.e., the website located at "http://www.WebMD.com," is a good source of information on the topic "back pain." The collective knowledge of these users can be used by the search engine to boost the relevance score of a search result from the website "WebMD" when another user submits a query on the topic "back pain" without identifying the navigational resource "WebMD" in the query.

This specification describes techniques that use search queries containing both terms identifying a topic and terms identifying a navigational resource to identify good authoritative information sources that are relevant for particular topics. Once the good authoritative information sources are identified for various topics, search results from these good authoritative information sources can receive a boost in their relevance and/or quality score for search queries directed toward those particular topics. Other uses of the associations between the navigational sources and topics are possible, and are disclosed in this specification.

Figure 2:
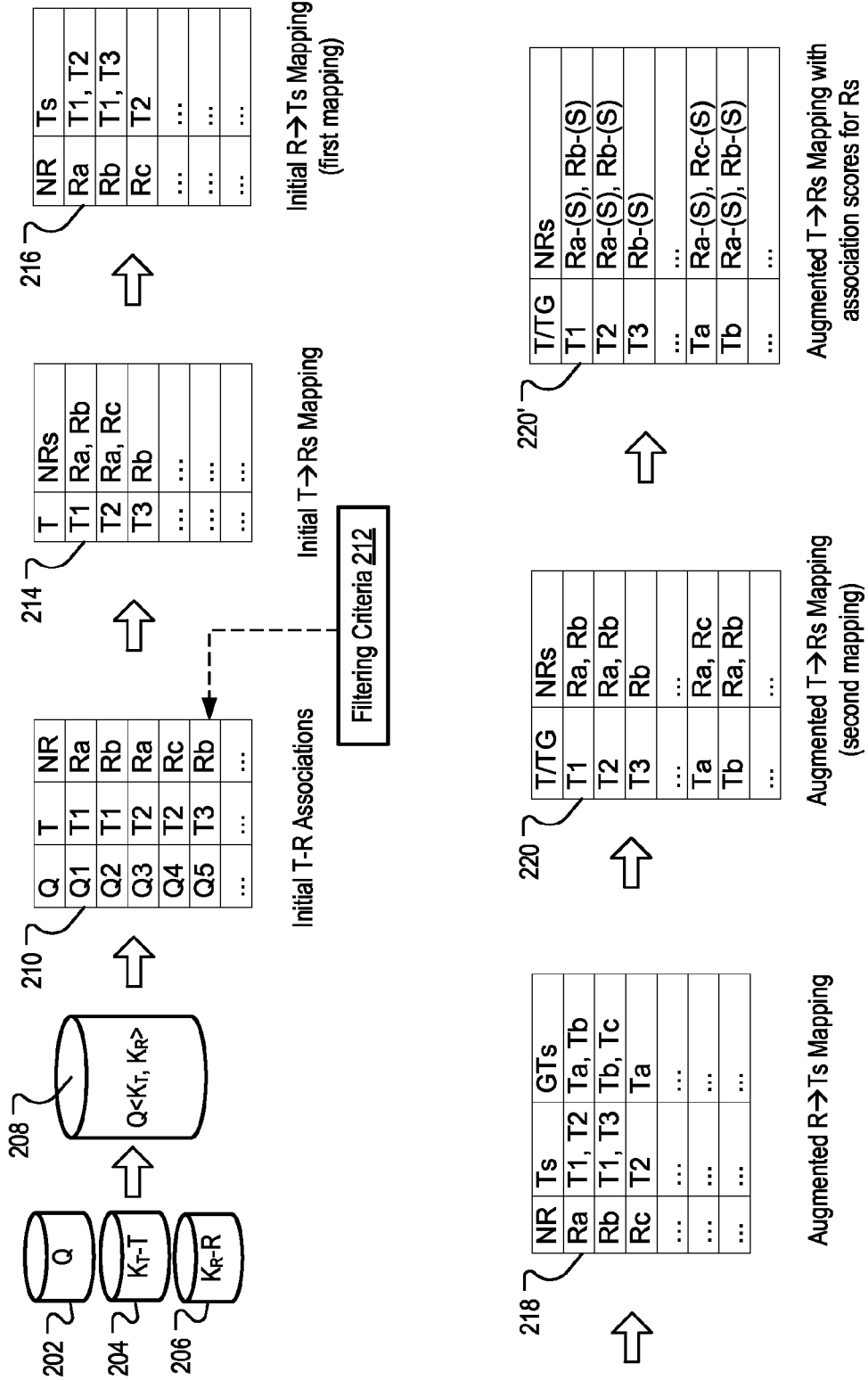
FIG. 2 illustrates an example process for generating a mapping from topics to respective navigational resources that are likely to be good information sources for the topics.

FIG. 2 illustrates an example process for generating a mapping from topics to respective navigational resources that are likely to be good information sources for the topics. As shown in FIG. 2, a search engine, e.g., the search engine 110 in FIG. 1, can access a query log 202 to identify a collection of queries 208 whose search terms include both the naming keyword of a topic and the naming keyword of a navigational resource. This collection of queries is a collection of hybrid queries that have both the characteristics of an informational query and the characteristics of a navigational query.

In some implementations, the search engine stores the respective naming keywords for identifying each topic in a collection of topics, e.g., arranged in a topic taxonomy, in a keyword-topic index 204. An example topic "southern cuisine" can have multiple naming keywords, "southern cuisine," "southern cooking," and "southern food," for example. The search engine stores the respective naming keywords for identifying each navigational resource in a collection of navigational resources in a keyword-resource index 206. Each of the collection of navigational resources contains resources that users seek out using one or more known names of the resource. The search engine determines whether a query stored in the query log 202 is a hybrid query by comparing the terms of the query with the naming keywords stored in the keyword-topic index 204 and the keyword-resource index 206.

Once a collection of hybrid queries 208 have been identified by the search engine, a collection of initial associations 210 between topics and navigational resources is created based on the collection of hybrid queries 208. The collection of hybrid queries 208 can be consolidated into a collection of unique hybrid queries each having an associated query count. Each unique query in the consolidated collection of hybrid queries 208 is used to create an association between the topic identified in the query and the navigational resource identified in the query. Each association represents a unique topic and navigational resource pair.

The search engine optionally filters the collection of initial associations 210 that are created based on the collection of hybrid queries 208. The filtering is based on one or more filtering criteria 212, which will be referred to as "association precision criteria". Initial associations that do not satisfy the one or more filtering criteria 212 are removed or excluded from the collection of initial associations 210.

For example, using one filtering criterion, if the navigational resource identified in an initial association does not receive at least a threshold fraction of all the clicks received for the search results of hybrid query from which the initial association is derived, then, the initial association is excluded from the collection of initial associations 210.

For another example, another filtering criterion involves some threshold number of query revisions leading from an informational query for the topic identified in an initial association to a navigational query for the navigational resource identified in the initial association. If the threshold number of query revisions is not satisfied, the initial association is excluded from the collection of initial associations 210.

For another example, using another filtering criterion, if the navigational resource identified in an initial association has not received a minimum number of clicks as a search result for an informational query on the topic identified in the initial association, the initial association is excluded from the collection of initial associations 210.

For another example, using another filtering criterion, if a query count associated with the hybrid query from which an initial association has been derived does not reach a minimum threshold, the initial association is excluded from the collection of initial associations 210.

The association precision criteria can be used independently or in combination. Other examples of association precision criteria are possible. The above examples illustrate the use of the association precision criteria for excluding initial associations that do not meet the criteria from the final collection of initial associations. The association precision criteria can be implemented to include initial associations that do meet the association-precision criteria in the final collection of initial associations.

In some implementations, rather than filtering the initial associations according to the association precision criteria to arrive at a final collection of initial associations 210, the filtering is performed on the collection of hybrid queries 208 before the collection of initial associations 210 is generated from the collection of hybrid queries. For example, in addition to requiring each hybrid query included in the collection 208 to include both the naming keyword of a topic and the naming keyword of a navigational resource, the search engine imposes one or more other criteria for identifying the collection of hybrid queries 208. The additional criteria for determining whether to include a candidate query in the collection of hybrid queries 208 can include, for example, one or more of the following: (1) a minimum number of times that the candidate query should appear in the query log 202; (2) a minimum click count that the navigational resource identified in the candidate query should have received as a search result of informational queries on a topic identified in the candidate query; (3) a minimum fraction of clicks that the navigational resource identified in the candidate query should account for in the total click count received by search results for the candidate query; and (4) a minimum number of query revisions in the query log 202 that each lead from an informational query for the topic identified in the candidate query to a navigational query for the navigational resource identified in the candidate query.

Once the final collection of initial associations 210 has been determined and stored, the final collection of initial associations 210 is processed to create an initial topic-to-resource mapping 214. This process can be occasionally repeated or restarted. Specifically, for each unique topic existing in the final collection of initial associations 210, all the navigational resources associated with the unique topic are identified from the final collection of initial associations 210, and a 1→x association is created between the unique topic and the one or more identified navigational resources, where x can be one or more.

For example, if the final collection of initial associations 210 include one to one associations <"back pain"-"WebMD">, <"back pain"-"Mayo Clinic">, <"headache"-"WebMD">, <"headache"-"Mayo Clinic"> and <"headache"-"National Headache Foundation">, then, the initial topic-to-resource mapping 214 will include two 1→x associations: (1) "back pain"→["WebMD", "Mayo Clinic"], and (2) "headache"→["WebMD", "Mayo Clinic", "National Headache Foundation"]. Each of these 1→x associations in the initial topic-to-resource mapping 214 indicates that each navigational resource identified in the 1→x association is likely to be a good source of information for the topic identified in the 1→x association.

After the initial topic-to-resource mapping 214 is created, the search engine inverts topic-to-resource associations in the initial topic-to-resource mapping 214 and consolidates the x→1 associations according to the unique navigational resources present in the initial topic-to-resource mapping 214. As a result of the inversion and consolidation, an initial resource-to-topic mapping 216 is generated. The initial resource-to-topic mapping 216 includes multiple 1→y associations, where y is one or more. The initial resource-to-topic mapping 216 includes for each unique navigational resource existing in the initial topic-to-resource mapping 214, all the topics associated with the unique navigational resource in the initial topic-to-resource mapping 214.

Continuing with the example above, the initial resource-to-topic mapping 216 will include 1→y associations: (1) "WebMD"→["back pain", "headache"], (2) "Mayo Clinic"→["back pain", "headache"], and (3) "National Headache Foundation"→["headache"], assuming that no other topics were associated with the resources "WebMD," "Mayo Clinic," and "National Headache Foundation" in the initial topic-to-resource mapping 214.

Although it is possible to create the initial resource-to-topic mapping 216 from the collection of initial associations 210 directly, with certain implementations of the search engine's data processing and storage infrastructure, it is more efficient to create the initial topic-to-resource mapping 214 first, and then invert the initial topic-to-resource mapping 214 to arrive at the initial resource-to-topic mapping 216.

For example, the collection of initial associations 210, the initial topic-to-resource mapping 214, and the initial resource-to-topic mapping 216 can be stored in a distributed data storage system and the processing of the data in the distributed data storage system can be accomplished through a distributed parallel data processing framework, e.g., MapReduce. By following the process described above, it can be more convenient and efficient to revise the mappings 214 and 216 as more queries are accumulated in the query log 202 and more topics and navigational resources have been added to the keyword-topic index 204 and the keyword-resource index 206.

After the initial resource-to-topic mapping 216 has been created, the topics associated with each unique navigational resource in the initial resource-to-topic mapping 216 can be generalized, such that one or more additional topics can be identified and associated with the unique navigational resource in an augmented resource-to-topic mapping 218. As shown in FIG. 2, the augmented resource-to-topic mapping 218 includes multiple 1→z associations from navigational resources to topics. Each 1→z association in the augmented resource-to-topic mapping 218 links a unique navigational resource from the initial resource-to-topic mapping 216 to both the original topics that were associated with the unique navigational resource, and also the generalized topics that have been identified for the unique navigational resource.

For example, for the 1→y association "WebMD"→["back pain", "headache"] in the initial resource-to-topic mapping 216, the search engine generalizes the topics "back pain" and "headache" to additional topics such as "pain" and "physical discomfort." Then, the search engine augments the 1→y association "Web-MD"→["back pain", "headache"] to the 1→y' association "WebMD"→["backpain", "headache", "pain", "physical discomfort"]. The search engine can generalize topics by organizing the topics recognized by the search engine in a hierarchical taxonomy, and generalizing topics based on locations of the topics in the taxonomy. For example, if two topics have the same ancestor topic in the taxonomy, that ancestor topic is identified as a generalized topic for the two topics.

When all of the associations in the initial resource-to-topic mapping 216 have been processed and the augmented resource-to-topic mapping 218 has been created, the augmented resource-to-topic 218 is inverted and consolidated again to create a new topic-to-resource mapping 220. The new topic-to-resource mapping 220 is an augmented topic-to-resource mapping that include a respective 1→x' association for each unique topic in the augmented resource-to-topic mapping 218. The augmented topic-to-resource mapping 220 differs from the initial topic-to-resource mapping 214 in that the 1→x' associations in the augmented topic-to-resource mapping 220 also link each of the generalized topics to their respective one or more navigational resources, where the navigational resources were associated with the generalized topic in the augmented resource-to-topic mapping 218.

In some implementations, a respective association score is given to each navigational resource in each 1→x' topic-to-resource association in the augmented topic-to-resource mapping 220. This will be described with reference to FIGS. 4A-4D. The augmented topic-to-resource mapping 220 may optionally include the association scores for each navigational resource in each 1→x' topic-to-resource association, as shown in mapping 220'.

The information stored in the augmented topic-to-resource mapping 220 or 220' can be used by the search engine in scoring candidate search results for queries on the topics included in the augmented topic-to-resource mapping 220, e.g., the informational queries that contain the naming keywords of the topics included in the augmented topic-to-resource mapping 220.

For example, given an association linking the topic "back pain" to the navigational resources "WebMD" and "Mayo Clinic" in the augmented topic-to-resource mapping 220, when an informational query consisting of the search terms "back pain" is received, resources, e.g., webpages, from the website identified by the name "WebMD" and from the website identified by the name "Mayo Clinic" each optionally receive a boost in their respective relevance scores as search results for the query "back pain." A boost is an increase in a score which may, but need not, change the ranking of the entity associated with the score, relative to other entities.

In some implementations, a navigational resource identified in a 1→x' topic-to-resource association can be a single webpage, and in that case, that webpage can be the only webpage that receives a boost as a search result for the informational query on the topic associated with that webpage in the mapping 220. Alternatively, in some implementations, if a navigational resource identified in a 1→x' topic-to-resource association is a single webpage, other webpages from the same website as the single webpage also receive a score boost as search results for the informational query on the topic associated with the single webpage in the mapping 220, even if those other pages themselves are not associated with the topic in the mapping 220.

For another example, if an informational query is received, and the topic of the informational query is closely related to a topic present in the augmented topic-to-resource mapping 220, then the navigational resources associated with the topic in the augmented topic-to-resource mapping 220 optionally receives a boost in their relevance scores as search results for the informational query.

In a more specific example, if an informational query "lower back pain" is received, and the topic of the informational query, i.e., "lower back pain," is closely related to a topic, e.g., "back pain," present in the augmented topic-to-resource mapping 220, then webpages from the website identified by the name "WebMD" and from the website identified by the name "Mayo Clinic" will optionally receive a boost in their respective relevance scores as search results for the query "lower back pain." In some implementations, this boost is only applied when the topic of the received informational query is not present in the augmented topic-to-resource mapping 220. In other implementations, this boost is applied even if the topic of the received informational query does exist in the augmented topic-to-resource mapping 220.

Optionally, a search result for a resource can be demoted as a candidate search result for an informational query for a topic. For example, a topic is associated with the augmented topic-to-resource mapping 220. If the resource is not associated with the topic while most other candidate search results refer to navigational resources associated with the topic, the resource can be demoted.

There are other applications for the information in the augmented topic-to-resource mapping 220 or 220'. For example, when presenting search results to a user in response to a user-submitted search query, in addition to the usual search results generated for the search query, the search engine optionally presents user interface elements, e.g., hyperlinks, to one or more suggested navigational resources, e.g., webpages or websites, that are associated with a topic identified by the search terms in the user-submitted search query according to the mapping 220 or 220'.

For example, if a user enters a search query "treatment for back pains," the search engine can determine the search results for this search query based on the usual process for generating search results for queries. In addition, the search engine determines that the search query contains terms identifying a topic, e.g., "back pain", that is present in the mapping 220. In some implementations, the search engine identifies the topic by normalizing the search query. Specifically, the search engine can normalize a term, e.g., "back pain", from one or more terms of the search query, e.g., "back pains". Based on the determination that the search query contains terms identifying the topic, the search engine presents a user interface element, e.g., a recommended site hyperlink, on the search result page that points to one or more of the navigational resources, e.g., the "WebMD" and "Mayo Clinic" websites, associated with the topic in the mapping 220. Optionally, the search engine can further issue a search within the navigational resources using the terms of the search query to identify one or more specific webpages within the navigational resources, and have the user interface element link to those specific webpages.

In another application for the information, the information in the topic-to-resource mapping 220 or 220' is optionally used in ordering candidate query suggestions or candidate query auto-completions when users enter queries that include, e.g., start off with, terms identifying a topic in the topic-to-resource mapping 220 or 220'.

For example, as the user types "back pain" in a search input interface, the search engine identifies a number of candidate auto-completions for the terms and presents the auto-completions in the search input interface for the user to select to complete the query entry rather than having to type out the whole query. Multiple factors may affect the order in which candidate auto-completions are presented to the user in the search interface. In some implementations, the search engine optionally applies a boost to candidate auto-completions that have search results leading to the navigational resources associated with the topic already entered by the user.

For example, "back pain clinics", "back pain WebMD" and "back pain Mayo clinic" are candidate auto-completions that have been identified for the query terms "back pain" that the user has entered. Both of the candidate auto-completions "back pain WebMD" and "back pain Mayo Clinic" have search results leading to navigational resources that are associated with the topic "back pain" in the topic-to-resource mapping 220. Based on the information in the mapping 220, the search engine applies a boost to the candidate auto-completions "back pain WebMD" and "back pain Mayo clinic," so that they are more likely to rank higher than other candidate auto-completions of the terms "back pain" and be shown to the user in the search interface.

Other applications of the augmented topic-to-resource mapping 220 or 220' are possible. More details of the process described in FIG. 2 are provided with reference to FIGS. 3-6.

Figure 3:
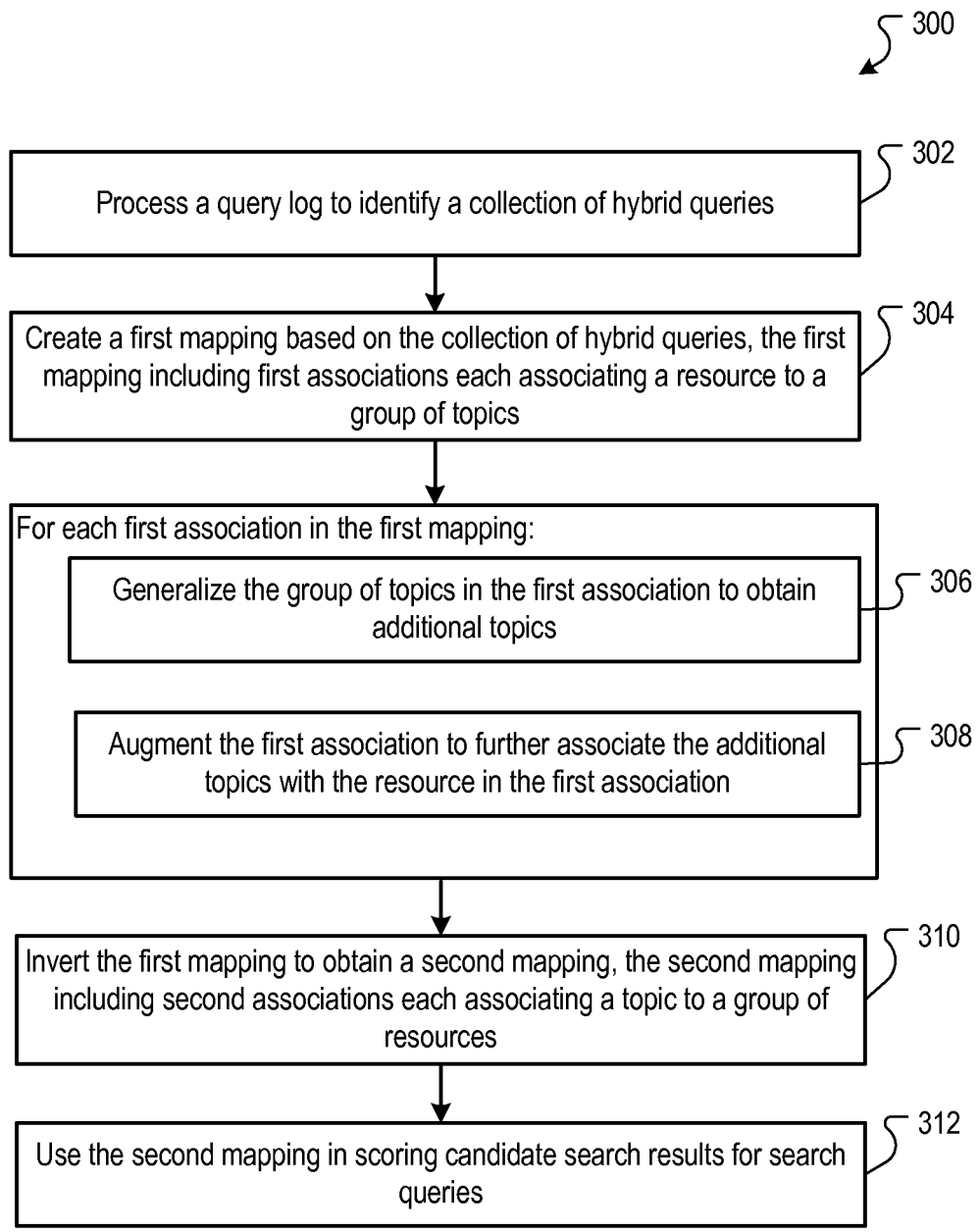
FIG. 3 is a flow diagram of an example process for generating a topic-to-resource mapping and using the topic-to-resource mapping in scoring search results for queries.

FIG. 3 is a flow diagram of an example process 300 for generating a topic-to-resource mapping, e.g., the augmented topic-to-resource mapping 220 or 220' in FIG. 2, and using the mapping in scoring search results for queries. The example process 300 is performed by a search engine or by a module that communicates with the search engine through a network, for example.

In the example process 300, a query log is processed such that hybrid queries each containing both a naming keyword of a topic and a naming keyword of a navigational resource are identified (302). As described above, to determine whether a query is a hybrid query, the terms of each query in the query log are compared to the naming keywords of known topics, i.e., topic keywords, and the naming keywords of known navigational resources, i.e., navigation keywords, stored by the search engine. If the query includes some terms matching the naming keyword of a topic, and other terms matching the naming keyword of a navigational resource, then the query is considered a hybrid query.

Then, a first mapping, e.g. the initial resource-to-topic mapping 216 in FIG. 2, is created, which includes first associations each associating a unique navigational resource identified by at least some of the hybrid queries to respective one or more unique topics identified by those hybrid queries (304). The unique navigational resource in each first association is one of the unique navigational resources that are found in the identified collection of hybrid queries.

In addition to the descriptions provided with reference to FIG. 2, more details on the creation of the first mapping will now be provided. The initial one-to-one associations between unique topics and unique navigational resources can first be established based on the collection of hybrid queries identified from the query log. Each initial association is based on a respective hybrid query. An initial association between a topic and a navigational resource is created based on a hybrid query that includes both the naming keyword of the topic and the naming keyword of the navigational resource. Based on the initial associations between unique topics and unique navigational resources, an initial topic-to-resource mapping, e.g., the initial topic-to-resource mapping 214 in FIG. 2, is generated. The first mapping, e.g., the initial resource-to-topic mapping 216 in FIG. 2, is created by inverting the initial topic-to-resource mapping and consolidating the inverted associations between topics and resources by unique navigational resources. Optionally, before the initial topic-to-resource mapping is generated from the initial associations, the initial associations are filtered based on one or more association precision criteria.

In the example process 300, based on the first mapping, e.g., the initial resource-to-topic mapping 216 in FIG. 2, a second mapping, e.g., the augmented topic-to-resource mapping 220 in FIG. 2, can be generated. Specifically, for each of the first associations in the first mapping, e.g., the first association $NR_m \rightarrow [T_a, T_b, \ldots]$, first, the respective group of topics in the first association is generalized to obtain one or more additional topics, e.g., $T_A$ and $T_B$, not present in the respective group of topics (306). Then, the first association, e.g., the first association $NR_m \rightarrow [T_a, T_b, \ldots]$, is augmented to further associate the navigational resource in the first association with the additional topics that have been identified (308). In other words, the respective group of topics associated with the navigational resource in the first association, e.g., the first association $NR_m \rightarrow [T_a, T_b, \ldots T_A, T_B]$, now also includes the one or more additional topics, $T_A$ and $T_B$, that have been identified.

Then, the first mapping including the augmented first associations, e.g., the augmented resource-to-topic mapping 218 in FIG. 2, is inverted to obtain a second mapping, e.g., the augmented topic-to-resource mapping 220 in FIG. 2, where the second mapping includes second associations each associating a unique topic with a respective group of one or more unique navigational resources (310). Each of the unique topics in the second mapping is a unique topic present in the augmented first mapping, and the group of unique navigational resources associated with the unique topic in the second mapping consists of the navigational resources associated with the unique topic in the augmented first mapping.

Once the second mapping, e.g., the augmented topic-to-resource mapping 220 in FIG. 2, has been obtained, the second mapping can be used in scoring candidate search results for search queries (312).

In some implementations, each second association in the second mapping, i.e., each augmented topic-to-resource association linking a unique topic to one or more unique navigational resources in the second mapping, can be given one or more association scores. Each of the one or more association scores is for a respective one of the navigational resources in the second association. The association scores are optionally provided to and used by the search engine in scoring candidate search results for queries.

FIGS. 4A-4D illustrate example processes for calculating the association score for a navigational resource in a second association in the second mapping. The processes shown in FIGS. 4A-4D can be used independently or in combination to generate a single score for navigational resource in the second association.

Figure 4A:
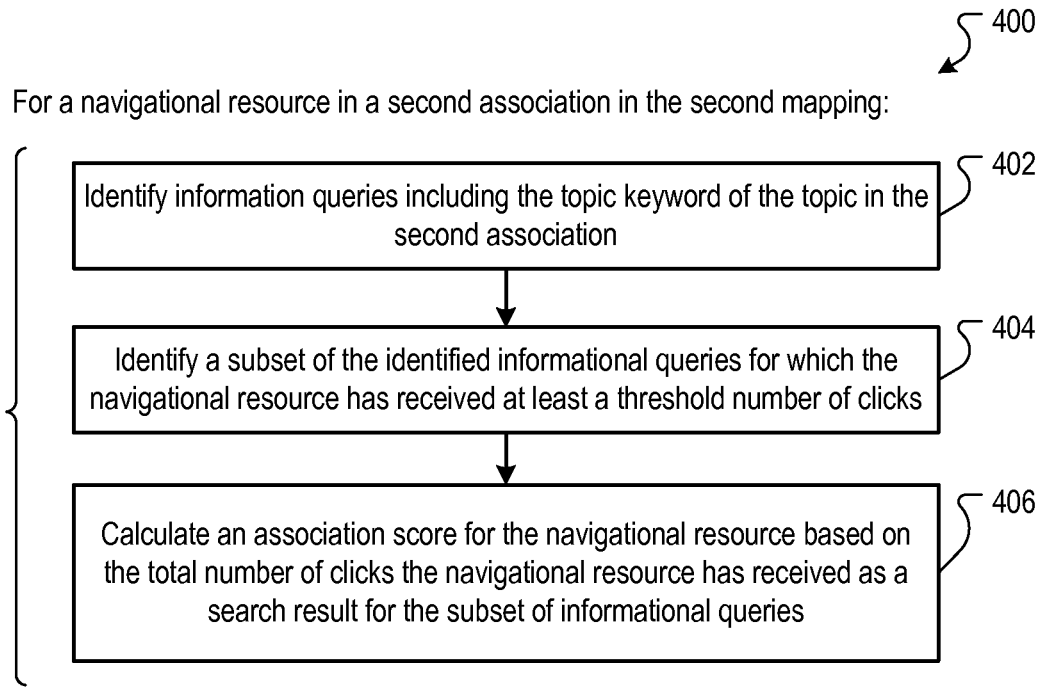
FIGS. 4A-4D are flow diagrams of example processes for generating association scores for topic-resource associations.

As shown in FIG. 4A, in an example process 400, for a navigational resource identified in the second association, multiple informational queries consisting of the naming keyword of the unique topic in the second association are identified from the query log (402). Then, a subset, i.e., one or more, of the identified informational queries are identified, where the navigational resource in the second association has received at least a threshold number of clicks, e.g., at least one click, as a search result for one of the informational queries in the subset (404). Then, the association score for the navigational resource in the second association is calculated based at least on the total number of clicks that the navigational resource in the second association has received as a search result for the subset of informational queries (406). In some implementations, in identifying informational queries identified from the query log, a system will also include informational queries consisting of synonyms of the naming keyword of the topic in the second association.

Figure 4B:
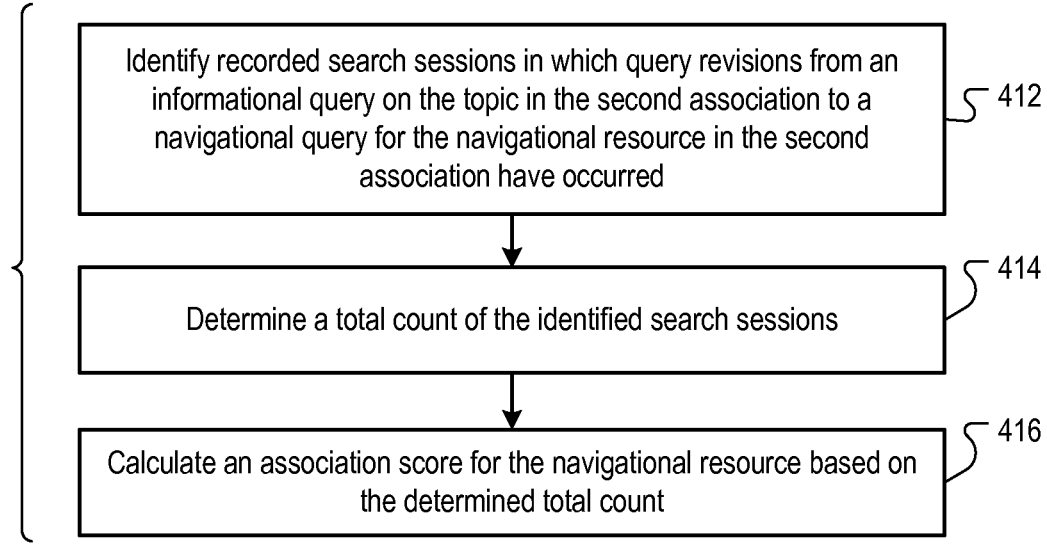

As shown in FIG. 4B, in an example process 410, for a navigational resource in a second association, first, multiple recorded search sessions are identified. In each of the identified search sessions, one or more query revisions from an informational query for the topic to a navigational query for the navigational resource have occurred (412). Then, a total count of the identified search sessions is determined (414). Then, the association score for the navigational resource in the second association is calculated based at least on the total count of the identified search sessions (416).

Figure 4C:
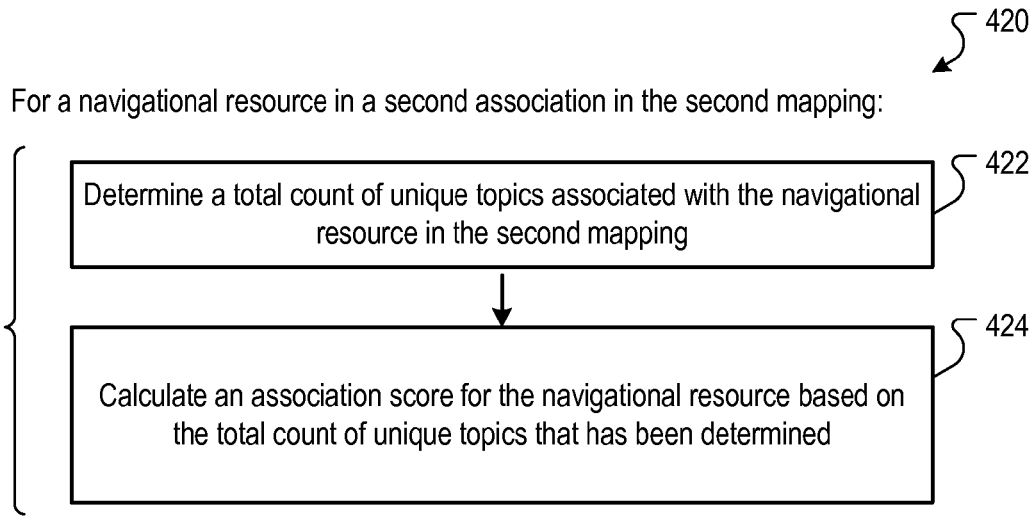

As shown in FIG. 4C, in an example process 420, to calculate the association score of a navigational resource in a second association in the second mapping, first, from among the second associations in the second mapping, a total count of the unique topics in the second mapping that are associated with the navigational resource in the second association is determined (422). Then, the association score of the navigational resource in the second association is calculated based at least on the count of the unique topics (424).

Figure 4D:
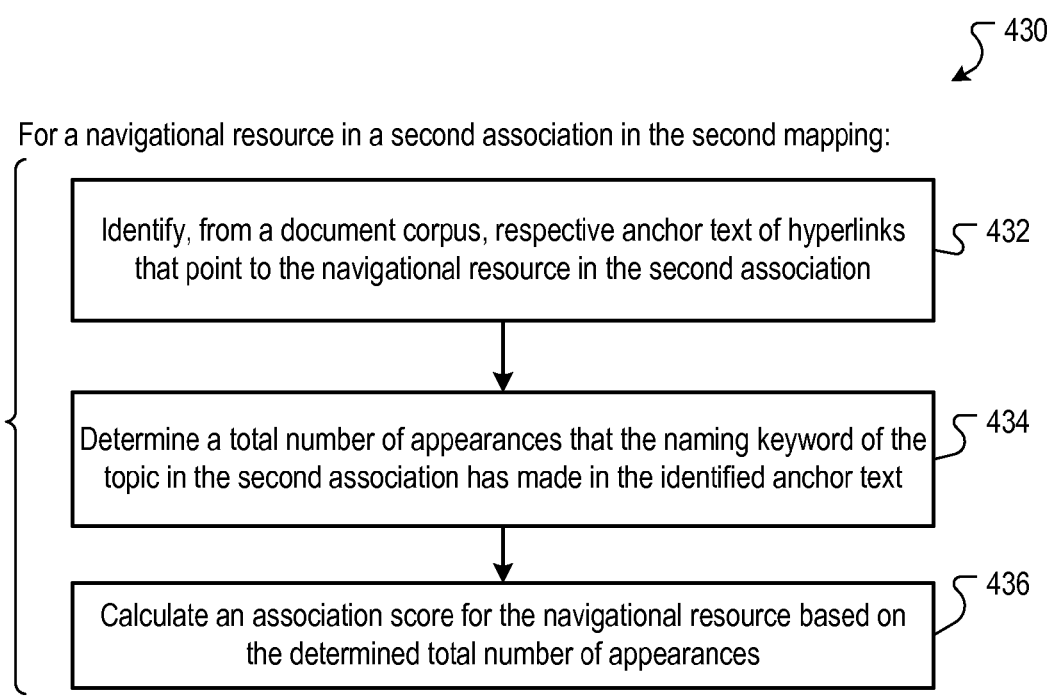

As shown in FIG. 4D, in an example process 430, to determine the association score for a navigational resource in a second association in the second mapping, first, respective anchor text of hyperlinks pointing to the navigational resource in the second association is identified from a document corpus (432). Then, the number of times that the naming keyword of the topic in the second association appears in the respective anchor text of the hyperlinks is determined (434). Then, the association score for the navigational resource in the second association is calculated based at least on the count of appearances that has been determined (436). In some implementations, the hyperlinks and their respective anchor text are identified from the indexed webpages stored cache index of the search engine.

The processes shown in FIGS. 4A-4D are merely illustrative. Other ways of calculating the association scores are possible.

In some implementations, the second mapping from unique topics to groups of navigational resources are further processed to obtain a third mapping from unique verticals to groups of navigational resources.

Figure 5:
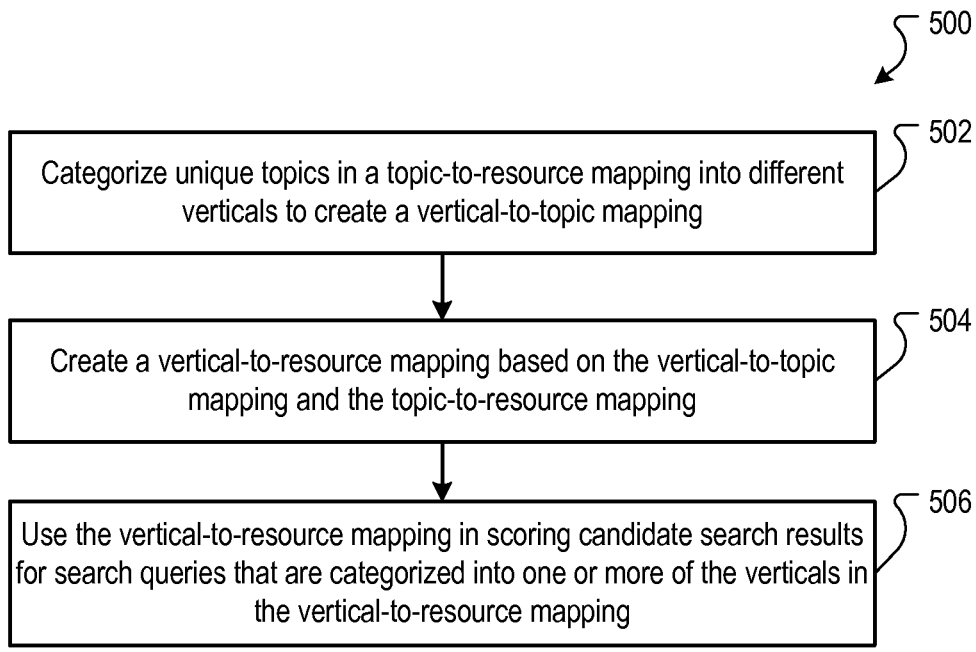
FIG. 5 is a flow diagram of an example process for creating a vertical-to-resource mapping based on the topic-to-resource mapping.

FIG. 5 is a flow diagram of an example process 500 for creating a one-to-many mapping from verticals to navigational resources, a vertical-to-resource mapping, from a one-to-many mapping from topics to navigational resources, e.g., the second mapping. In the example process 500, first, the unique topics in the second mapping are categorized into multiple different verticals, such that each vertical includes a group of one or more unique topics from the second mapping, and each unique topic in the second mapping belongs to one or more unique verticals (502). Based on the mapping from verticals to topics, each vertical is further mapped to the navigational resources that are associated with the topics in the second mapping. For example, in the process 500, a vertical-to-resource mapping is created based on the vertical-to-topic mapping and the topic-to-resource mapping (504). The vertical-to-resource mapping includes multiple vertical-to-resource associations, each vertical-to-resource association associating a respective one of the unique verticals with a respective group of navigational resources, and each of the respective group of navigational resources is associated with at least one of the unique topics in the second mapping that have been categorized into the respective unique vertical. In some implementations, the vertical-to-resource mapping is optionally used in scoring candidate search results for search queries that are categorized into one or more of the unique verticals (506).

For example, when search query is received from a user, a vertical related to the user-submitted search query may be determined. After the vertical of the user-submitted search query has been determined, one or more navigational resources associated with the vertical are identified according to the vertical-to-resource mapping, and the identified navigational resources can receive a boost in their respective information retrieval scores as candidate search results for the user-submitted search query.

In some implementations, the methods described above for creating a topic-to-resource mapping and vertical-to-resource mapping can be expanded to creating other types of mappings. For example, a topic-to-author mapping can be created in a similar manner based on previously received user queries stored in the query log.

Figure 6:
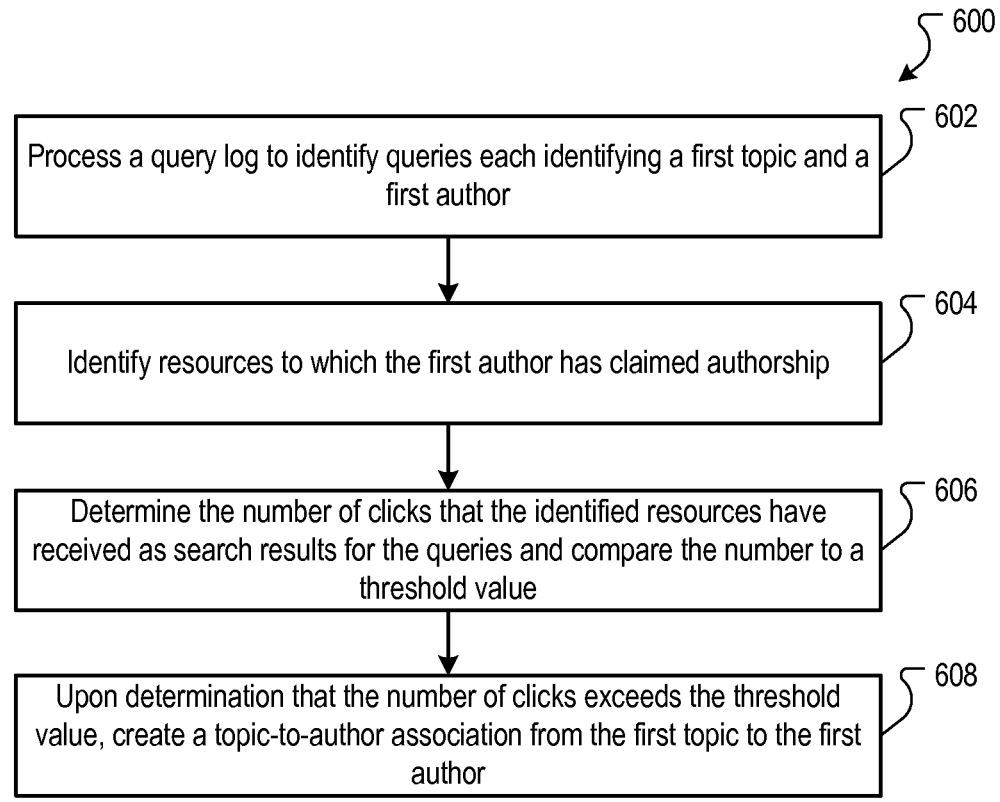
FIG. 6 is a flow diagram of an example process for creating a topic-to-author mapping.

FIG. 6 is a flow diagram of an example process 600 for creating a topic-to-author mapping based on recorded user queries. In the example process 600, a query log is processed to identify queries that each includes terms identifying a topic among multiple known topic and terms identifying an author among multiple known authors (602). In some implementations, the keywords for identifying the known authors are stored in an author index. The keyword for identifying a known author can be a known pseudonym of the author, for example. Then, for the identified author, respective resources to which the author has claimed authorship are identified (604). For example, an index storing respective resources to which various known authors have claimed authorship can be consulted to determine the resources to which the identified author has claimed authorship. Then, the number of clicks that the identified resources have received as search results for the queries is determined and compared to a threshold value (606). If the number of clicks is above the threshold value, a respective topic-to-author association from the topic to the author is created (608). A topic-to-author mapping can be created by repeating the steps of example process 600 for additional topics and authors that are presented in queries in the form "<terms identifying topic> <terms identifying author>".

In some implementations, information in the topic-to-author mapping are optionally used in scoring search results for future search queries on the topics or authors found in the topic-to-author mapping. Consider as an example that a topic "back pain" is associated with an author "Doctor Z" in the topic-to-author mapping, and the author "Doctor Z" has claimed authorship to an article "Myths about Back Pains." A search result linking to the article can optionally receive a boost in its relevance score for a newly received search query containing the terms "back pain." Other applications of the topic-to-author mapping are possible. For example, the topic-to-author mapping can be further processed to obtain a vertical-to-author mapping, using the techniques described above. For another example, the topic-to-author mapping and the author-to-resource mapping can be used to further augment the topic-to-resource mapping to include the works to which the authors have claimed authorship, using the techniques described above.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be computer-readable medium, e.g., a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program, also known as a program, software, software application, script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
    identifying queries that each include (i) one or more first terms that are associated with a particular topic and (ii) one or more second terms, different than the one or more first terms, that are associated with a particular author;
    identifying web resources for which the particular author has been identified as an author;
    determining a quantity of selections of search results that (i) are generated in response to one or more of the queries and (ii) reference one or more of the web resources for which the particular author has been identified as an author;
    associating the particular author with the particular topic, as a topic-to-author association, when the quantity of selections satisfies a threshold that is associated with more than one selection; and
    using the topic-to-author association in ranking a search result, which references one or more of the web resources, that is generated in response to one or more subsequently received queries that includes one or more of the first terms that are associated with the particular topic.

2. The method of claim 1, further comprising:
    creating a topic-to-author mapping by repeating the steps of claim 1 for at least one additional topic and at least one additional author, where the topic-to-author mapping includes the topic-to-author association of the particular author with the particular topic and an additional topic-to-author association from the at least one additional topic to the at least one additional author; and
    using the topic-to-author mapping in scoring candidate search results for queries.

3. The method of claim 1, wherein the web resources are websites or webpages having respective associated web addresses.

4. The method of claim 1, further comprising:
    providing a user interface element on a search result webpage for each of the one or more subsequently received queries, the user interface element configured to identify the search result, which references one or more of the web resources, that is generated in response to the one or more subsequently received queries that includes one or more of the first terms that are associated with the particular topic associated with the particular topic.

5. The method of claim 1, wherein the web resources for which the particular author has been identified as an author are identified based on an index storing respective web resources to which various authors have claimed authorship.

6. The method of claim 1, wherein the threshold comprises a threshold proportion of the quantity of selections to all selections of search results generated in response to one or more of the queries.

7. A non-transitory medium storing instructions that, when performed by one or more computers, cause the one or more computers to perform operations comprising:
    identifying queries that each include (i) one or more first terms that are associated with a particular topic and (ii) one or more second terms, different than the one or more first terms, that are associated with a particular author;
    identifying web resources for which the particular author has been identified as an author;
    determining a quantity of selections of search results that (i) are generated in response to one or more of the queries and (ii) reference one or more of the web resources for which the particular author has been identified as an author;
    associating the particular author with the particular topic, as a topic-to-author association, when the quantity of selections satisfies a threshold that is associated with more than one selection; and
    using the topic-to-author association in ranking a search result, which references one or more of the web resources, that is generated in response to one or more subsequently received queries that includes one or more of the first terms that are associated with the particular topic.

8. The medium of claim 7, wherein the operations further comprise:
    creating a topic-to-author mapping by repeating the steps of claim 3 for at least one additional topic and at least one additional author, where the topic-to-author mapping includes the topic-to-author association of the particular author with the particular topic and an additional topic-to-author association from the at least one additional topic to the at least one additional author; and
    using the topic-to-author mapping in scoring candidate search results for queries.

9. The medium of claim 7, wherein the web resources are websites or webpages having respective associated web addresses.

10. The medium of claim 7, wherein the operations further comprise:
    providing a user interface element on a search result webpage for each of the one or more subsequently received queries, the user interface element configured to identify the search result, which references one or more of the web resources, that is generated in response to the one or more subsequently received queries that includes one or more of the first terms that are associated with the particular topic associated with the particular topic.

11. The medium of claim 7, wherein the web resources for which the particular author has been identified as an author are identified based on an index storing respective web resources to which various authors have claimed authorship.

12. The medium of claim 7, wherein the threshold comprises a threshold proportion of the quantity of selections to all selections of search results generated in response to one or more of the queries.

13. A system, comprising:
one or more computers; and
memory having instructions stored thereon, the instructions, when performed by the one or more computers, cause the one or more computers to perform operations comprising:
identifying queries that each include (i) one or more first terms that are associated with a particular topic and (ii) one or more second terms, different than the one or more first terms, that are associated with a particular author;
identifying web resources for which the particular author has been identified as an author;
determining a quantity of selections of search results that (i) are generated in response to one or more of the queries and (ii) reference one or more of the web resources for which the particular author has been identified as an author;
associating the particular author with the particular topic, as a topic-to-author association, when the quantity of selections satisfies a threshold that is associated with more than one selection; and
using the topic-to-author association in ranking a search result, which references one or more of the web resources, that is generated in response to one or more subsequently received queries that includes one or more of the first terms that are associated with the particular topic.

14. The system of claim 13, wherein the operations further comprise:
creating a topic-to-author mapping by repeating the steps of claim 5 for at least one additional topic and at least one additional author, where the topic-to-author mapping includes the topic-to-author association of the particular author with the particular topic and an additional topic-to-author association from the at least one additional topic to the at least one additional author; and
using the topic-to-author mapping in scoring candidate search results for queries.

15. The system of claim 13, wherein the web resources are websites or webpages having respective associated web addresses.

16. The system of claim 13, wherein the operations further comprise:
providing a user interface element on a search result webpage for each of the one or more subsequently received queries, the user interface element configured to identify the search result, which references one or more of the web resources, that is generated in response to the one or more subsequently received queries that includes one or more of the first terms that are associated with the particular topic associated with the particular topic.

17. The system of claim 13, wherein the web resources for which the particular author has been identified as an author are identified based on an index storing respective web resources to which various authors have claimed authorship.

18. The system of claim 13, wherein the threshold comprises a threshold proportion of the quantity of selections to all selections of search results generated in response to one or more of the queries.

* * * * *